Oct. 18, 1949.  J. C. HANNA  2,484,883
PNEUMATIC SHOCK ABSORBING CYLINDER
Filed Feb. 23, 1946  2 Sheets-Sheet 1
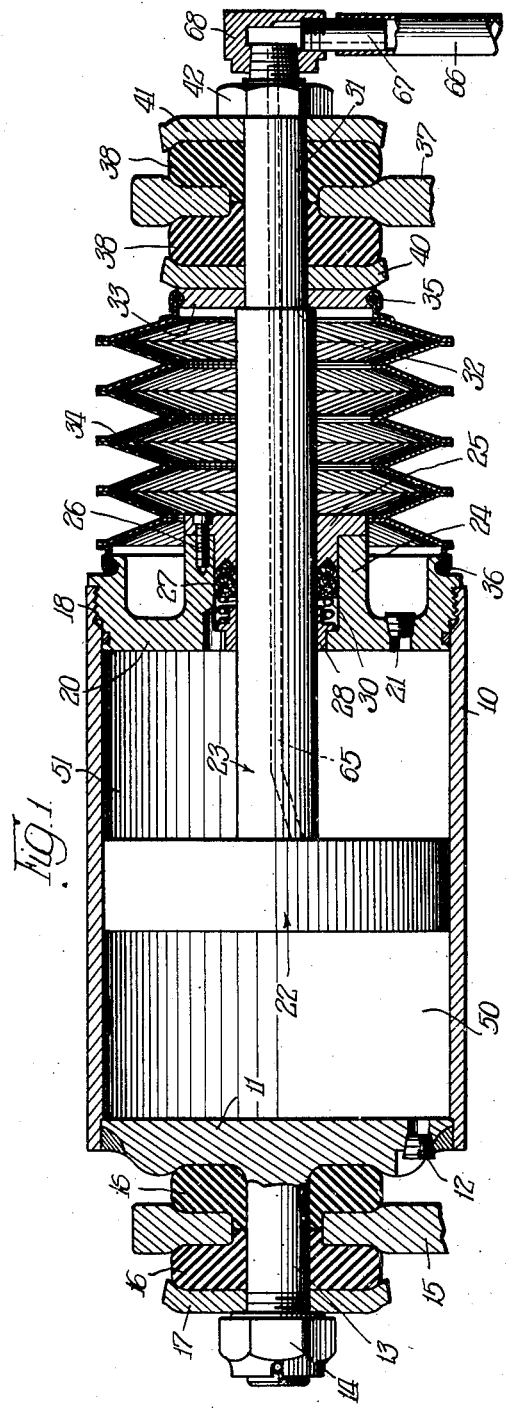
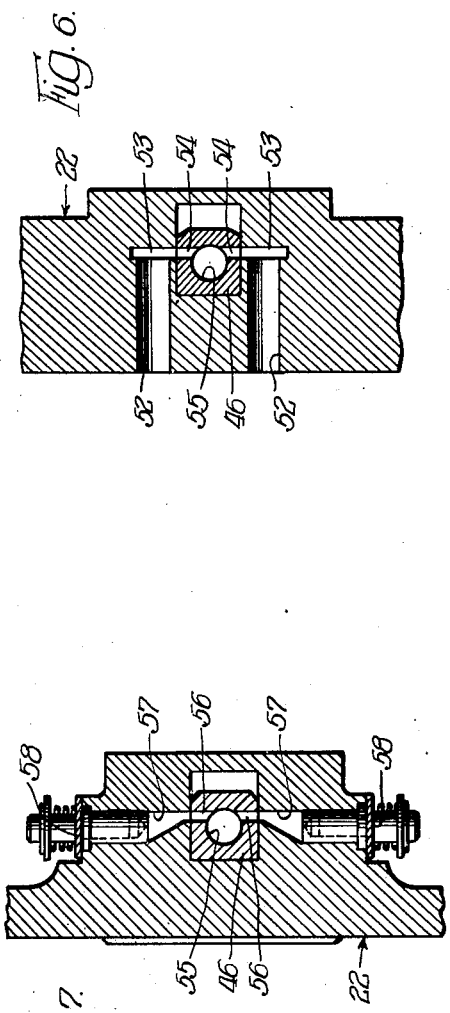
INVENTOR.
John C. Hanna,
BY

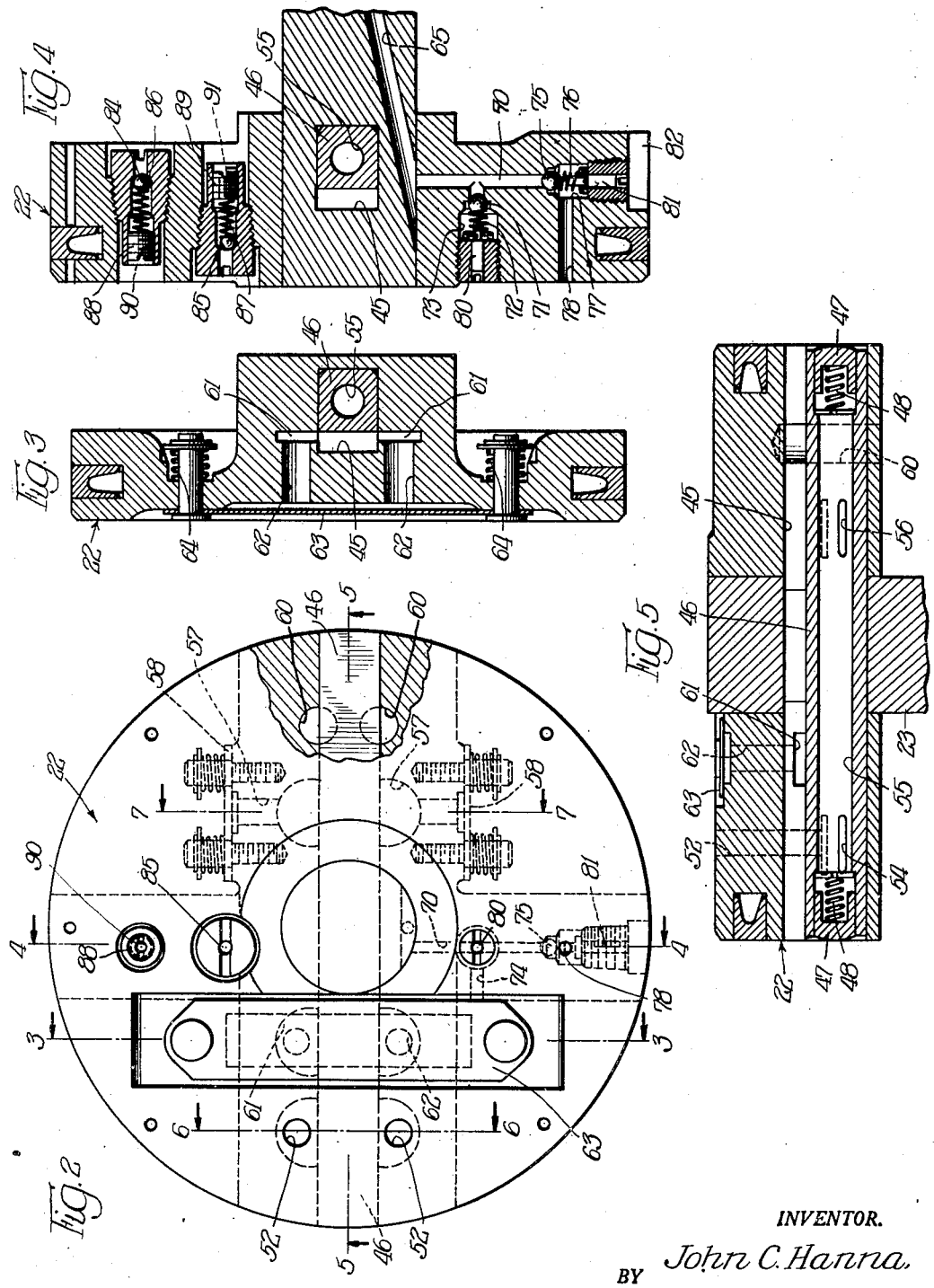

Patented Oct. 18, 1949

2,484,883

UNITED STATES PATENT OFFICE 2,484,883

PNEUMATIC SHOCK ABSORBING CYLINDER

John C. Hanna, Chicago, Ill., assignor to Hanna Engineering Works, Chicago, Ill., a corporation of Illinois Application February 23, 1946, Serial No. 649,531

9 Claims. (Cl. 188—88)

1

The invention relates to shock absorbing cylinders and has reference in particular to pneumatic shock absorbing and snubbing devices for use on road vehicles, airplanes, track vehicles and similar apparatus where it is desired to retard or cushion the movement between certain movable parts.

In the shock absorbing and snubbing cylinder of the invention the piston incorporates an arrangement of valve members and associated parts whereby when the piston is moving and the pressure behind the piston is greater than the pressure ahead of the piston, certain of said valve members will automatically operate, permitting flow of air through the piston from the high pressure side to the low pressure side to thus reduce the total driving action of the air upon the piston. This flow of air through the piston produces an intensified snubbing effect since the forces acting in a driving direction are decreased and the forces acting to retard the piston are correspondingly increased. When the present device is applied to vehicle parts having relative movement its function is two-fold. First, the initial approaching or initial separating movement of the parts is resisted and secondly, the rebound and succeeding back and forth motions are dampened to reduce them to zero or to such small amount as must necessarily continue in the particular installation. Accordingly, the device serves both as a shock absorber and as a snubber.

Another object of the invention is to provide a double action checking or cushioning device using a plurality of valved passages in the piston of said device and which passages are automatically rendered operative in a selective manner by movement of the piston to permit flow of air through the piston when certain conditions exist.

Another object is to provide a shock absorbing cylinder having an improved arrangement of parts incorporated in the piston for automatic actuation by motion of the piston to effect flow of air through the same from one end of the cylinder to the opposite end to thereby intensify the snubbing effect on the piston.

A more specific object is to provide a shock absorbing cylinder of the type described having valve units and associated parts incorporated in the piston and which are actuated at the beginning of each stroke to permit flow of air through the piston, from the relatively high pressure side in which the air is expanding to the low pressure side in which the air is being compressed, to thereby reduce the driving effect and correspondingly increase the resisting effect.

2

A further object of the invention resides in the provision of a shock absorbing and snubbing cylinder having an arrangement of valves and associated parts incorporated in the piston for admitting a fluid medium to the two cylinder spaces from an external source when the pressure in each space is less than the supply pressure and wherein the flow of said medium into said cylinder spaces is terminated when the pressure in any one is raised to the pressure of the external source.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is a longitudinal sectional view taken substantially through the center of a shock absorbing and snubbing cylinder embodying the improved features of the invention;

Figure 2 is an elevational view of the rear face of the piston showing the improved arrangement of valve units and associated parts incorporated in the piston;

Figure 3 is a transverse sectional view through the piston taken approximately along line 3—3 of Figure 2;

Figure 4 is a transverse sectional view through the piston taken substantially on a diameter as shown by line 4—4 of Figure 2;

Figure 5 is a transverse sectional view through the piston taken substantially along line 5—5 of Figure 2;

Figure 6 is a fragmentary sectional view taken transversely of the piston substantially on line 6—6 of Figure 2; and Figure 7 is a fragmentary sectional view taken transversely through the piston substantially on line 7—7 of Figure 2.

Referring to the drawings, particularly Figure 1, the embodiment selected for illustrating the present invention is shown as comprising a cylinder 10 having suitably secured to the rear end thereof the end member 11. The end member is provided with lubricating means in the form of a removable screw 12 and said end member is also provided with a central rearwardly projecting stud 13 having a threaded extremity for receiving the securing nut 14. The stud 13 functions as securing means for the bracket 15 which is provided with an aperture somewhat larger than the stud so that substantial movement can occur between the same and the bracket. As clearly shown in the drawings, the bracket is preferably dished for receiving rubber cushioning members 16 which are also supported by the stud and the whole assembly is retained in place, being securely united to the end member 11 by the cap 17 and said securing nut 14. It will thus be seen that a rubberized substantially universal joint is provided between the bracket 15 and the cylinder 10, it being understood that said bracket may be secured to a part of the vehicle or to any relatively moving part.

The forward end of cylinder 10 is internally threaded as at 18 for receiving the forward end member 20 which is accordingly releasably secured to said cylinder. The member 20 is provided with lubricating means in the form of a removable screw 21 and provision is made for the passage of the piston rod centrally through said end member. The piston 22 is adapted to reciprocate within cylinder 10 from a position adjacent the rear end member 11 to the forward end member 20 and return. Movement is imparted to said piston by means of the piston rod 23 which extends through the central opening provided therefor in the forward end member 20. Said central opening is defined by the forwardly extending boss 24 which is adapted to receive the packing gland 25, the same being releasably secured in place by screws 26. Said packing gland retains the packing 27 within the boss 24 and in contact with said piston rod 23. The packing for the piston rod also includes the metal collar 28 having telescoping relation with the piston rod and which is held in place by suitable shoulders provided by the boss 24. The coil spring 30 is confined between the packing 27 and the collar 28 and it will be understood that said coil spring applies pressure to said packing to maintain a tight joint with respect to the reciprocating piston rod 23 and one which will substantially hermetically seal this end of the cylinder although permitting free and unobstructed reciprocating movement of the piston rod as is well understood in shock absorbers of this type.

The projecting end of the piston rod is slightly reduced in diameter as at 31 to form the shoulder 32 against which is positioned the disc 33. Said disc provides an anchorage for one end of the bellows 34, the same being suitaby fixed to said disc around the periphery of the same as at 35. The other end of the bellows member 34 is suitably secured to the forward end member 20, the securing instrumentalities for this end of the bellows being indicated by numeral 36.

Reduced portion 31 of the piston rod provides securing means for the bracket 37 which has an aperture of large diameter for receiving the said reduced end and which permits substantial movement to take place between the bracket and the piston rod 23. This movement, however, is cushioned by the rubber cushioning members 38 located on the respective sides of the bracket and which are securely held in place by means of end caps 40 and 41 and the securing screw 42. The present shock absorbing cylinder is accordingly mounted by means of brackets 15 and 37 to movable parts of a road vehicle, airplane, track vehicle or similar apparatus wherein it is desired to retard or cushion the movement of said parts. In the present shock absorbing device the piston 22 incorporates an arrangement of valve members and associated parts which automatically operate as a result of movement of the piston to provide for flow through the piston of the pressure medium confined within cylinder 10. The structure of said piston and mode of operation to accomplish the above objectives will now be described.

The piston 22 is provided with a transverse passage 45, as best shown in Figure 5, the same extending diametrically of the piston and piston rod. The passage receives the valve bar designated in its entirety by numeral 46 and which has a sliding fit as regards said passage so that the valve bar may move from the forward end of the passage to the rear end or vice versa, depending on the movement of the piston. At each end of the valve bar 46 there is provided a friction plug 47 backed by the coil spring 48. The friction plugs are thus forced into contact with the cylinder surface and sufficient friction is encountered to effect sliding movement of the valve bar within its passage as the piston reverses its movement. In other words, when the piston is moving forward in a direction toward the right, Figure 1, the friction of the plugs 47 on the cylindrical surface of the cylinder 10 will hold the valve bar against the back surface of the passage 45, as clearly illustrated in Figures 6 and 7. When the valve bar is in this position there is a flow of air from the rear cylinder space 50 into the forward cylinder space 51, Figure 1, provided that the pressure in the rear cylinder space is the higher. The air or other pressure medium within the cylinder flows from the rear cylinder space through the openings 52 provided in the rear surface of the piston, as best shown in Figure 6. By means of the ports 53 communicating with passages 52 and which are aligned with ports 54 in the valve bar 46, the air is permitted to enter the central passage 55 in the valve bar. Said passage 55 extends longitudinally of the valve bar and ports 56 similar to 54 are provided in the end of the valve bar opposite thereto. Said ports conduct the air through passages 57 formed in the piston, Figure 7, and which are in alignment therewith by reason of the position of the valve bar. From passages 57 the air escapes through check valves 58 into the forward cylinder space. The valve bar 46 will remain in the position shown in Figures 6 and 7 until the motion of the piston reverses, at which time the valve bar, due to the friction between the friction plugs 47 and the cylinder space, is shifted in its passage 45, with the result that the valve bar is now in contact with the forward end of the passage 45, as shown in Figures 3 and 4. With the valve bar in this forward position within the piston, flow of air will take place from the forward cylinder space 51 to the rear cylinder space 50, provided higher pressure prevails in the forward cylinder space. Under these conditions air will enter the piston through openings 60 formed in the forward surface of the piston as will be clearly understood by reference to Figure 1. The passages 60 are located to the respective sides of the valve bar and they continue beyond the same so as to communicate with the passage 45. With the valve bar in the forward end of the passage 45 the air from passages 60 is permitted to enter the space within said passage which is unoccupied by the valve bar and said air flows diametrically across the piston to the ports 61 which are open as shown in Figure 3, having communication with passage 45 by reason of the position of the valve bar 46. From port 61 the air is discharged to passages 62 which are normally closed by the valve member 63. When pressure on the under-side of valve member 63 is sufficient to lift said member against the tension of the coil springs 64 the air is discharged to the rear cylinder space.

The shock absorbing and snubbing effect produced by the present device can be materially increased by increasing the air pressure in the cylinder. For example, assuming a piston in mid-position as measured by volume with pressure on each side being the same, if the piston is moved away from mid-position a distance to decrease the volume on one side of the piston by one-fifth and to increase the volume on the other side by one-fifth a net resisting intensity of pressure is created equal to .57 times the absolute pressure at mid-position. With the original pressure of zero gauge or atmospheric a net resisting pressure of 8.4 pounds per square inch of piston area would result. With an original gauge pressure of one hundred pounds per square inch a resisting pressure of 65.4 pounds per square inch would be built up for this same relative amount of motion. Net energy absorbed by the air would be proportional to the above figures, although they are affected to a limited extent due to the presence of the piston rod.

On the reverse stroke the conditions are quite different since the pressure on the expansion side is greater than that on the compression side. Under these conditions the improved structure for flow of air through the piston comes into action. On the reversal of the piston the valve bar is shifted to permit the flow of air from the driving, relatively high pressure side in which the air is expanding, into the opposing or low pressure side in which the air is being compressed, thereby reducing the driving pressure of the air and increasing the resisting pressure thereof as has already been explained. In many cases the forces that must be checked by the shock absorber are material and since it is desirable and often necessary to keep the device small and compact air at a relatively high pressure is used. In the present device provision is made for admitting to the cylinder high pressure air from an external source. A bore 65 is provided in the piston rod 23 longitudinally of the same and air is supplied to said bore from an external source by means of the flexible conduit 66, having connection with pipe 67 threaded to nipple 68. Said nipple is suitably secured to the outer extremity of the piston rod 23 beyond the securing screw 42. The flexible conduit 66, by reason of the passage formed in the nipple, has communication with the longitudinal bore which delivers the air to the piston.

Assuming the piston 22 to be in mid-position volumetrically of the cylinder with atmospheric pressure on both sides, then upon admitting air from the external source the same is conducted by bore 65 to the communicating passage 70 formed in the piston and extending substantially radially thereof. Pressure is accordingly applied to the ball 71, lifting the valve against the tension of its backing spring 72. The high pressure air is admitted to the valve port 73 and to the communicating passage 74, Figure 2, which discharges the air to the forward cylinder space. A similar ball valve 75 is associated with passage 70, the same being backed by spring 76 in the valve port 77 and which port communicates with passage 78 leading to the rear cylinder space. Valve springs 72 and 76 are relatively weak, their only function being to hold the ball valves 71 and 75, respectively, against their seats. Flow of air into the rear cylinder space increases the pressure which acts against plunger 80 and thus against the ball valve 71. In a similar manner flow of air into the forward cylinder space increases the pressure which acts against plunger 81, and thus against the ball valve 75. In order that plunger 81 may be subjected to pressure in the forward space the piston is provided with a peripheral slot 82 as shown in Figure 4.

The valve seats, backing springs and plungers are so proportioned that when supply pressure or a predetermined part of said supply pressure is reached in one of the cylinder spaces flow of air into both cylinder spaces is shut off.

Assuming that air pressures, spring resistance, plunger diameters and flow capacity are equally matched, and starting with equal cylinder volumes, it is believed clear that rates of flow into the cylinder spaces will be equal and that on admitting air at a relatively high pressure from the external source, pressure in the two cylinder spaces will increase uniformly until both pressures have been raised to supply pressure or to a predetermined part of said supply pressure. On the other hand, should the resistance in the passage leading to one of the cylinder spaces be appreciably less than that of the passage to the other cylinder space, pressure in the former will be raised to the limiting pressure sooner than that in the latter and would act to shut off further flow into both cylinder spaces. For example, should the pressure in the forward cylinder space 51 be increased to supply pressure, or to a predetermined part of said supply pressure before that in the rear cylinder space 50, such pressure will act upon plunger 81 and in turn upon ball valve 75 to prevent further flow through passage 78 into the rear cylinder space. The purpose of the arrangement herein disclosed of said valves and plungers is to provide that when the cylinder is operative all air that is forced into or out of the cylinder spaces during the shock absorbing and snubbing action shall move through the piston under control of the valve bar to perform the double function of reducing the pushing pressure and increasing the resisting pressure on the piston.

In order to avoid undesirably high pressures in either cylinder space relief valves 84 and 85 are provided, as shown in Figure 4. Valve 84 is held in closed position by the backing spring 86, whereas, valve 85 is held in closed position by the backing spring 87. Each spring is in turn properly positioned and maintained in place by a slotted adjusting screw 88 and 89, respectively, and each screw is provided with a central bore 90 and 91, providing an outlet passage for its particular relief valve. By adjustment of screws 88 and 89 the proper pressure can be applied to the ball valves 84 and 85 so that they will maintain a closed position during operation of the piston under normal conditions. However, should an excessive pressure for some reason or other exist in either the forward or rear cylinder spaces, the respective relief valve will open against the tension of its backing spring to permit release of said pressure by admitting the excess air to the cylinder space on the opposite side of the piston.

The invention is not to be limited to or by details of construction of the particular embodiment thereof illustrated in the drawings, as various forms of the device will of course be apparent to those skilled in the art without departing from the spirit of the invention or the scope of the claims.

What is claimed is:

1. In a shock absorbing cylinder, a piston movable therein a piston rod for moving the piston, said piston having at least two passages extending through the same in a direction substantially parallel to its movement, valve means for said passages operative in opposing directions to permit flow of a compressed fluid through the piston, and other valve means in the piston associated with both passages and automatically actuated at the beginning of a stroke as a result of movement of the piston for selectively opening said passages.

2. In a shock absorbing cylinder, a piston movable therein, a piston rod for moving the piston, said piston having at least two passages extending through the same in a direction substantially parallel to its movement, valve means for said passages operative in opposing directions to permit flow of a compressed fluid through the piston, and a slidable valve bar in the piston associated with both passages, said valve bar being movable in a direction parallel to that of the piston, and said valve bar in its respective positions opening and closing the passages alternately.

3. In a shock absorbing cylinder, a piston movable therein, a piston rod for moving the piston, said piston having at least two passages extending through the same in a direction substantially parallel to its movement, valve means for said passages operative in opposing directions to permit flow of a compressed fluid through the piston, a slidable valve bar extending diametrically within the piston and having association with both passages, said bar being movable in a direction parallel to that of the piston and having forward and rear positions, said bar in forward position closing only one of said passages and in its rear position closing the other passage, and friction means at the respective ends of the valve bar for engaging the side walls of the cylinder whereby said bar is automatically moved from one position to its other as a result of movement of the piston.

4. A shock absorber as described comprising a closed cylinder, a piston movable therein, a piston rod connected to the piston and extending outwardly of the cylinder for imparting movement to the piston, said piston having at least two passages extending through the same for passing a fluid from either end of the cylinder to the other, oppositely seating valve means for the passages respectively, and other valve means in the piston associated with both passages and having movement to close and open the passages alternately, said other valve means being rendered operative at the beginning of a stroke of the piston to open that passage permitting flow of said fluid through the piston in the direction of its movement.

5. A shock absorber as described comprising a closed cylinder, a piston movable therein, a piston rod connected to the piston and extending outwardly of the cylinder for imparting movement to the piston, said piston having at least two passages extending through the same for passing a fluid from either end of the cylinder to the other when predetermined pressure differences exist in said cylinder on the respective sides of the piston, oppositely seating valve means for the passages respectively, and means for intensifying the snubbing effect on said piston including a valve member within the piston actuated by movement of the piston and having association with both said passages for closing and opening the passages alternately, said valve member being rendered operative at the beginning of a stroke of the piston to open that passage permitting flow of said fluid through the piston in the direction of its movement.

6. In a cushioning device, the combination of a cylinder, a piston movable therein, a piston rod for moving said piston, said piston rod having a passage connecting with an external source of fluid under pressure, said piston having an interior chamber communicating with the passage, at least two valved openings in the piston leading from said chamber and terminating on opposite sides of the piston whereby said pressure fluid may be delivered to the respective ends of the cylinder, and each valved opening having valve shut-off mechanism associated therewith and which is controlled by the pressure on the side of the piston opposite its opening, whereby said flow of pressure is stopped when the pressure in both or either of the cylinder spaces has been raised to that of said source or to a predetermined part of said source.

7. In a cushioning device as described, in combination a cylinder having closed ends, a piston mounted for reciprocating movement within the cylinder and having a piston rod extending through one end of the cylinder exteriorly thereof, said piston and piston rod having means permitting flow of fluid from an external source into the cylinder on each side of the piston, said means including a passage extending longitudinally of the piston rod and valved openings in the piston having communication therewith, one of said valved openings having location on the forward side of the piston and the other having location on the rear side of the same, and each valved opening having valve shut-off mechanism associated therewith and which is subject to the pressure on the side of the piston opposite its opening so as to be controlled by said pressure.

8. In a cushioning device, the combination of a cylinder having closed ends, a piston relatively movable in the cylinder, a piston rod for moving the piston and which rod extends through one end of the cylinder exteriorly thereof, said piston having a passage through the same whereby a fluid within the cylinder may flow from one side of the piston to the other to equalize the pressures in the respective ends of the cylinder, a valve member mounted by the piston for movement and actuated by movement of the piston for controlling the opening and closing of said passage, and said piston and piston rod having means permitting flow of fluid from an external source into the cylinder on each side of the piston, said means including a bore extending longitudinally of the piston rod, and a pair of valved openings in the piston having communication therewith, one of said valved openings having location on the forward side of the piston and the other valved opening having location on the rear side of the same, and each valved opening having valve shut-off mechanism associated therewith and which is controlled by the pressure on the side of the piston opposite its opening.

9. In a cushioning device, the combination of a cylinder having closed ends, a piston relatively movable in the cylinder, a piston rod for moving the piston and which rod extends through one end of the cylinder exteriorly thereof, said piston having passages through the same whereby a fluid within the cylinder may flow from either side of the piston to the other to equalize the pressures in the respective ends of the cylinder, a valve member movably mounted in the piston and actuated by movement of the piston for controlling the opening and closing of said passages, and said piston and piston rod having means permitting flow of fluid from an external source into the cylinder on each side of the piston, said means including a bore extending longitudinally of the piston rod and connecting with said external source of fluid under pressure, said piston having an interior chamber communicating with the bore, a pair of valved openings in the piston in communication with said chamber, one of said valved openings having location on the forward side of the piston and the other valved opening having location on the rear side of the same, and each valved opening having shut-off mechanism associated therewith and which is subject to the pressure on the side of the piston opposite its opening so as to be controlled by said pressure.

JOHN C. HANNA.

REFERENCES CITED

The following references are of record in the file of this patent:

UNITED STATES PATENTS

| Number | Name | Date |
| --- | --- | --- |
| 1,474,498 | Swanstrom | Nov. 20, 1923 |
| 1,876,355 | Smith | Sept. 6, 1932 |
| 2,015,759 | Moulton | Oct. 1, 1935 |
| 2,035,954 | Focht | Mar. 31, 1936 |